3,428,120
AQUEOUS FLUID FLOODING METHOD FOR RECOVERING OIL
Alvin V. Metler, Dallas, Tex., assignor to Mobil Oil Corporation, a corporation of New York
No Drawing. Filed Dec. 22, 1966, Ser. No. 603,721
U.S. Cl. 166—250                          6 Claims
Int. Cl. E21b 47/00, 43/20

ABSTRACT OF THE DISCLOSURE

The recovery of oil from a subterranean formation by passage therethrough of an aqueous flooding fluid. More particularly, there are described procedures in such method wherein the injectivity index of an injection well, through which well an aqueous fluid is introduced into a formation, is maintained relatively constant during the injection of such flooding fluid. In one aspect, there is described in this method the use of a water-soluble hydrosulfite salt, e.g., sodium hydrosulfite, in the aqueous fluid entering the formation from which oil is produced.

BACKGROUND OF THE INVENTION

Field of the invention

This invention relates to the production of oil from a subterranean formation. More particularly, it relates to the recovery of oil by employing an aqueous flooding fluid for displacing the oil in a subterranean formation from an injection well toward a production well.

Description of the prior art

The production of oil from certain subterranean formation cannot be obtained by using primary recovery methods which depend primarily upon natural reservoir forces. Under such circumstances, the recovery of oil may be facilitated by employing secondary recovery methods. In these methods, the natural reservoir forces are supplemented by external means to produce the oil. One secondary recovery method displaces oil from a subterranean formation with an aqueous fluid. In this method, the aqueous flooding fluid is injected into the formation via an injection well. The fluid traverses the formation to displace the oil into a production well from which it is recovered. The aqueous flooding fluid can be surface water, brine, water derived from adjacent geological formations, or water separated from oil extracted from a particular formation. Water may be obtained from other sources, if desired.

One of the problems involved with using aqueous fluid injection for improving oil recovery is that the fluid carries organic and inorganic particles. These particles can plug flow channels in the formation adjacent the injection well. Additionally, the fluid carries corrosive materials including oxygen. The corrosive materials also produce particles which plug flow channels in the formation. Further, plugging of fluid channels occurs by the particles formed from ferric ions produced by reaction of the oxygen carried in the fluid with iron pipes conveying the fluid and with ferrous ions resident in the formation adjacent the injection well. Plugging of these channels restricts the injection of the aqueous fluid in the formation. When the rate of fluid injection into the formation at the injection well decreases to an unacceptable amount, remedial action must be taken; otherwise, the rate of oil production from an adjacent production well will be restricted.

The formation adjacent the injection well may be fractured when the formation becomes plugged sufficiently to reduce the rate of injection of the flooding fluid. Fracturing the formation creates now flow channels. The formation may be acid treated to increase the number of flow channels through which the flooding fluid can be introduced. However, after a period of time, these new flow channels will be plugged by the particles carried in the flooding fluid and those produced by reaction of oxygen in the fluid.

It would be desirable to employ a method, when plugging of the flow channels in the formation adjacent an injection well is expected, that does not rely on the above-mentioned remedial procedures to correct the problem after it has occurred. The primary object of the present invention is to provide such a method.

SUMMARY OF THE INVENTION

The present invention provides an improvement to the method for recovering oil from a subterranean formation by the injection thereinto of an aqueous flooding fluid. The flooding fluid is carried in iron pipes into the formation via an injection well and contains particles and corrosive materials which include oxygen. Injection of the flooding fluid displaces oil through the formation. The oil is recovered from a production well spaced from an injection well in the formation. However, injecting the flooding fluid also causes plugging of the flow channels in the subterranean formation adjacent the injection well.

The improvement of this invention to the above method for the recovery of oil from a subterranean formation involves the following steps: (a) measuring the injectivity index of the injection well from which the flooding fluid enters the formation at the time when injection of the flooding fluid begins; (b) measuring the injectivity index of the well thereafter at periodic intervals during injection of the flooding fluid into the formation; (c) adding to the flooding fluid an amount of a water-soluble hydrosulfite salt effective to maintain the injectivity index, of the injection well with the aqueous flooding fluid entering the formation, at least as great as the injectivity index when injection of the flooding fluid began; and (d) continuing the practice of steps (b) and (c) until a substantial quantity of oil is recovered from the production well. Additionally, the water-soluble hydrosulfite salt may be added to the flooding fluid at a location remote from said injection well; certain water-soluble hydrosulfite salts may be used; and the injectivity index of the injection well may be increased in magnitude as injection of the flooding fluid continues.

DESCRIPTION OF SPECIFIC EMBODIMENTS

The improved flooding method for recovering oil from a subterranean formation is practiced in the following manner. A subterranean formation containing producible oil is provided with an injection well and a production well which are spaced apart in the formation. These wells provide fluid communication between the earth's surface and the formation. A source of aqueous flooding fluid is obtained; and for purposes of description, this may be considered to be water taken from another subterranean formation.

This water contains many types of inorganic salts which include both readily soluble salts and those which are relatively insoluble. Additionally, the water contains organic and inorganic particles, as for example, fine sand particles. The water also contains corrosive materials, including oxygen.

In many cases, the water is subject to a surface treatment for improving its characteristics as an aqueous flooding fluid. However, economic considerations require that not all of the undesired particles and corrosive materials are removed from the water which is to be injected into the subterranean formation which contains oil. The flooding fluid is carried, at least in some part, in iron pipes from its source to the injection well. Under such conditions, the oxygen reacts with iron to produce ferric hydroxide in the flooding fluid. The ferric hydroxide is a plugging material that seals off the flow channels in the subterranean formation. Additionally, this oxygen will react with any ferrous ions present in the injection well, or in the adjacent formation, and produce therein ferric hydroxide which causes additional plugging of the flow channels.

Therefore, the injection of the aqueous flooding fluid produces plugging of the flow channels in the subterranean formation. This plugging, if uncontrolled, becomes progressively more severe until the injection of the flooding fluid decreases to undesirable levels.

However, in the present invention, these problems are avoided in the following manner. As soon as the injection of flooding fluid begins, the injectivity index of the injection well from which flooding fluid enters the formation is measured. This provides a measure of the performance of the injection well. The injectivity index is defined as the rate of liquid transfer through the injection well, into the formation, in barrels per day, per pound pressure drop, between the flowing bottomhole pressure and the formation pressure. The injectivity index is:

$$I.I. = \frac{Q_w}{P_w - P_e}$$

wherein:

$Q_w$ is the rate of water injection;
$P_w$ is the pressure at formation face, p.s.i.a; and
$P_e$ is the pressure at radius of drainage, p.s.i.a.

The injectivity index of the injection well is also measured at periodic intervals during the injection of the flooding fluid into the formation. Such measurements will indicate whether or not the formation adjacent the injection well is subject to plugging of its flow channels by the various plugging materials carried in the aqueous flooding fluid.

During the period of time when the aqueous flooding fluid is being injected into the formation, a water-soluble hydrosulfite salt is added to the flooding fluid.

The water-soluble hydrosulfite salt may include any cation with the hydrosulfite anion. For example, the cation may be sodium or zinc, and mixtures thereof. Preferably, the water-soluble hydrosulfite salt is selected from the group consisting of sodium hydrosulfite, zinc hydrosulfite, and mixtures thereof. Good results are obtained by use of the sodium hydrosulfite. In the present description, the water-soluble salt is sodium hydrosulfite. However, it is to be understood that any other water-soluble hydrosulfite salt may be used in practice of the present method.

The sodium hydrosulfite is added in an amount effective to maintain the injectivity index of the injection well, with the aqueous flooding fluid entering said formation, at least as great as it was when injection began. Usually, the injectivity index is maintained at a relatively constant magnitude, and not substantially below the injectivity index when injection of the flooding fluid began. However, in some situations, it is preferable that the amounts of the sodium hydrosulfite are increased so as to increase the injectivity index of the injection well to a magnitude greater than the injectivity index when injection of the flooding fluid began. The amounts of the sodium hydrosulfite salt may be added continuously or at intervals to provide these results, if desired.

The practice of the steps of measuring the injectivity index and adding the necessary amounts of sodium hydrosulfite to maintain the injectivity index at a desired magnitude is practiced until a substantial quantity of oil is recovered from the production well. For preferred results, the sodium hydrosulfite is added to the flooding fluid at a location remote from the injection well. By this means, the longer resident time in the fluid of the additive permits a higher degree of reaction to remove plugging materials.

The chemical action of the sodium hydrosulfite, or other water-soluble hydrosulfite salt, in maintaining the injectivity index of the injection well is not understood. However, it is known that these compounds will clarify water having ferric hydroxide as a gelatinous precipitate, or any precipitated iron compound, without forming other precipitates, such as the black flocculants of the ferrous hydroxide which occurs by reaction of ferric ions with alkali metal sulfites and other sulfur-containing reducing agents. The addition of these hydrosulfite salts to a water containing precipitated iron compounds produces a clear solution. Additionally, these hydrosulfite salts function to convert water-insoluble ferric and ferrous compounds into water-soluble ferrous compounds in the formation. The resultant ferrous compounds then are miscibly displaced through the formation before the injected aqueous flooding fluid.

The sodium hydrosulfite, by its removal of the ferric and ferrous ions, and compounds, in the formation adjacent the injection well, functions to maintain the injectivity index of the injection well at least at about its original value. As was earlier mentioned, various particles are carried in the flooding fluid and plug flow channels in the subterranean formation adjacent the injection well. However, the sodium hydrosulfite removes ferric and ferrous ions, and compounds, from the formation and places them into solution. This dissolving action thereby creates new flow channels in the subterranean formation. These new flow channels offset the flow channels lost by their plugging with the small amounts of organic and inorganic particles carried in the flooding fluid. In many instances, useful increases in magnitude of the injectivity index of the injection well can be obtained by the addition of the mentioned salt to flooding fluid.

Additionally, the sodium hydrosulfite serves as a scavenger for any oxygen in the aqueous flooding fluid. This is particularly an advantage since the flooding fluid is carried at least in some part in iron pipes. Removing oxygen from the fluid prevents corrosion of the iron pipes, and also the corresponding production of ferric hydroxide which causes plugging in the formation adjacent the injection well.

The sodium hydrosulfite employed in this invention may be obtained from any source and may be in any state of purity. However, it is preferred to have the sodium hydrosulfite relatively free of any substances which themselves would cause a plugging of the flow channels in the formation. The sodium hydrosulfite is also known as sodium hyposulfite. In order to avoid any possibility of confusion, the following structural formula is used to designate this compound, $Na_2S_2O_4$. The commercially available sodium hydrosulfite is of the following composition, $Na_2S_2O_4 \cdot 2H_2O$, and has a molecular weight of approximately 210.

The sodium hydrosulfite employed in the present method is to be distinguished from the sodium sulfites which are available commercially and used in various water treatment procedures. These sulfites presently available and used in water treatment are the normal sodium sulfite and sodium bisulfite (the commercial product being sodium pyrosulfite or sodium metabisulfite).

It will be appreciated that the amounts of sodium hydrosulfite required to maintain the injectivity index of the aqueous floodwater used in recovering oil from a subterranean formation are relatively small. This material is very effective as used in this method. Additionally, its function is twofold; in removing oxygen which causes generation of precipitated iron compounds and in removing ferric and ferrous ions, and compounds, already present in the formation adjacent the injection well so as to create additional flow channels therein.

From the foregoing, it will be apparent that the method herein described is well suited to provide significant advantages in the recovery of oil from a subterranean formation by employing an aqueous flooding fluid therein. Various changes and alterations in the steps of the present method can be made by those skilled in the art without departing from the spirit of the invention. It is intended that such changes and alterations be encompassed within the appended claims. Additionally, the foregoing description of the present invention is illustrative and not limitative.

What is claimed is:

1. In the recovery of oil from a subterranean formation which is subject to plugging of flow channels, by solids including iron compounds, adjacent an injection well through which is injected an aqueous flooding fluid containing corrosive materials including oxygen, said flooding fluid being carried in iron pipes, and oil is recovered from a production well spaced from said injection well in the formation, the improvement comprising the steps of:
   (a) measuring the injectivity index of said injection well from which said flooding fluid enters said formation at the time when injection of said flooding fluid begins,
   (b) measuring the injectivity index of the well thereafter at periodic intervals during injection of said flooding fluid into said formation,
   (c) adding to said flooding fluid an amount of a water-soluble hydrosulfite salt effective to maintain the injectivity index, of said injection well with said aqueous flooding fluid entering said formation, at a magnitude at least as great as the injectivity index when injection of said flooding fluid began, and
   (d) continuing the practice of steps (b) and (c) until a substantial quantity of oil is recovered from said production well.

2. The method of claim 1 wherein said water-soluble hydrosulfite salt is added to said flooding fluid at a location remote from said injection well.

3. The method of claim 1 wherein said water-soluble hydrosulfite salt is selected from the group consisting of sodium hydrosulfite, zinc hydrosulfite, and mixtures thereof.

4. The method of claim 1 wherein said water-soluble hydrosulfite salt is sodium hydrosulfite.

5. The method of claim 1 wherein said water-soluble hydrosulfite salt is zinc hydrosulfite.

6. The method of claim 1 wherein in step (c) the water-soluble hydrosulfite salt is added to the flooding fluid in an amount to increase the injectivity index of the injection well to a magnitude greater than the injectivity index when injection of said flooding fluid began.

References Cited

UNITED STATES PATENTS 3,343,601  9/1967  Pye _____ 166—9 X

OTHER REFERENCES

Frick, Thomas C.; Petroleum Production Handbook, vol. II, McGraw-Hill, N.Y., 1962, pp. 41–48, 41–49, and 41–66.

CHARLES E. O'CONNELL, *Primary Examiner.*

IAN A. CALVERT, *Assistant Examiner.*

U.S. Cl. X.R.

166—275